(12) United States Patent
Lin

(10) Patent No.: US 6,782,059 B2
(45) Date of Patent: Aug. 24, 2004

(54) DISCONTINUOUS TRANSMISSION (DTX) DETECTION

(75) Inventor: Yu-Chuan Lin, Carlsbad, CA (US)

(73) Assignee: Qualcomm Incorporated, San Diego, CA (US)

(*) Notice: Subject to any disclaimer, the term of this patent is extended or adjusted under 35 U.S.C. 154(b) by 180 days.

(21) Appl. No.: 10/061,865

(22) Filed: Jan. 31, 2002

(65) Prior Publication Data

US 2003/0142728 A1 Jul. 31, 2003

(51) Int. Cl.[7] .......................... H04B 1/707; H03D 1/00; H04L 27/06
(52) U.S. Cl. ...................... 375/340; 375/147; 375/316; 455/522
(58) Field of Search ................................ 375/147, 148, 375/224, 227, 340, 316; 370/252, 329, 332, 333, 335, 342, 441; 455/522

(56) References Cited

U.S. PATENT DOCUMENTS

| | | | | |
|---|---|---|---|---|
| 5,936,979 A | * | 8/1999 | Jyrkka | 714/763 |
| 6,147,964 A | * | 11/2000 | Black et al. | 370/209 |
| 6,181,738 B1 | * | 1/2001 | Chheda et al. | 375/224 |
| 6,208,699 B1 | | 3/2001 | Chen et al. | 375/340 |
| 6,370,392 B1 | * | 4/2002 | Li et al. | 455/522 |
| 6,374,118 B1 | * | 4/2002 | Toskala et al. | 455/522 |
| 6,587,447 B1 | * | 7/2003 | Wang et al. | 370/335 |
| 2002/0086692 A1 | * | 7/2002 | Chheda et al. | 455/522 |

FOREIGN PATENT DOCUMENTS

| | | |
|---|---|---|
| EP | 1089456 | 4/2001 |
| WO | 9953701 | 10/1999 |
| WO | Wo 01/01610 A1 * | 1/2001 |
| WO | 0203588 | 1/2002 |
| WO | 9705717 | 1/2002 |

* cited by examiner

Primary Examiner—Betsy L. Deppe
(74) Attorney, Agent, or Firm—Philip R. Wadsworth; Charles D. Brown; Timothy F. Loomis

(57) ABSTRACT

Novel techniques are disclosed for detecting discontinuous transmission (DTX) over a communication channel. A received data frame is characterized as one of a Good frame, Erasure, or DTX. If a Good frame is not initially detected, a multi-dimensional quality metric is used to characterize the received frame as either an Erasure or DTX. A two dimensional quality metric may be generated using energy per bit to noise power ratio as a first dimension and re-encoded symbol error count as a second dimension. Alternatively, re-encoded symbol energy may be used as the second dimension of the quality metric. The communication channel may be a CDMA wireless communication channel capable of DTX and the device may be a base station, base station controller, or mobile station.

24 Claims, 3 Drawing Sheets

DISCONTINUOUS TRANSMISSION (DTX) DETECTION

BACKGROUND

1. Field

The invention relates to digital communications. More particularly, the invention relates to discontinuous transmission (DTX) detection.

2. Description of the Related Art

Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of systems. For example, a CDMA system provides increased system capacity.

A CDMA system may be designed to support one or more CDMA standards such as (1) the Telecommunications Industry Association (TIA)/Electronic Industries Association (EIA) "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (4) some other standards.

Wireless telephone systems are capable of carrying both voice and data over the allocated communication channels. Digital wireless telephone systems are particularly suited to carrying data over the allocated communication channels. It is possible for the system to dedicate a channel to a user, via the user's Mobile Station (MS), in order to accomplish data transmission. A continuously active channel is preferable when the anticipated data transmission is continuous. With a continuously active channel, the user is able to efficiently transmit or receive a continuous data stream over the allocated active channel of the communication system. However, the exploding increase of packet data applications, such as those used when communicating over the Internet, make allocating a continuously active channel to a single user an over allocation of resources. Control signals sent from a base station to a mobile station or messaging may occur only infrequently and it may not be desirable to allocate a continuously active channel for a limited purpose. Additionally, because wireless telephone rates are often tied to connection times, a user may not be willing to use a MS to connect to a remote network if a continuous active channel must be dedicated to the connection.

The designers of wireless telephone systems have recognized the desire for packet data applications over wireless channels. The designers have also recognized that packet data and the associated burst transmissions may be transmitted over channels that are not continuously active, but rather, allow for discontinuous transmission (DTX).

With discontinuous transmission, communication to a receiver over a channel does not occur continuously but may be cycled on and off. The receiver is then faced with the problem of determining when a signal was transmitted or when there is a lack of a signal. A receiver may easily make the DTX detection decision under ideal channel conditions. The receiver would demodulate the transmitted signals as they arrive and realize that lack of a signal to demodulate indicates that the transmitter is engaging in DTX, and is in fact not transmitting a signal.

However, a real world communication link does not operate under ideal channel conditions, nor does a real world receiver operate with an ideal demodulator. In a real world application, signal multipath, fading, path loss, noise, and interference corrupt the signal incident on the receiver. Additionally, the receiver demodulator is not ideal and may not accurately demodulate every received signal. The result of non-ideal characteristics is that a receiver demodulating a continuously transmitted signal will occasionally be unable to recover the transmitted data.

As an example, within any cell of a CDMA wireless telephone system, all users transmit in the same bandwidth at the same time and each user's transmission contributes to the interference experienced by all other users. A power control process is used to adjust the transmit power to achieve a minimum desired signal quality at the receiver. The interference contribution experienced by other users is minimized because the transmit power to each user is minimized. Because the interference level is minimized, the number of user's that can simultaneously communicate over the channel is maximized.

A typical CDMA communication system uses closed loop power control to help alleviate the problems associated with a non-ideal link from the transmitter to the receiver. A closed loop control process is used to control transmission power on both the forward and reverse links in a CDMA system. In closed loop control, a transmission is made, a measurement is made at the receiver, and feedback is provided to the transmitter.

In closed loop power control, the receiver tracks the performance of a demodulator and calculates a metric that is based on the quality of the received signal. A typical metric used in the receiver is the received energy per bit to noise power ratio ($E_b/N_t$). The receiver performance may be characterized over varied $E_b/N_t$ values such that a probability of detection is known for a given $E_b/N_t$ value. Alternatively, the receiver may estimate an actual signal error rate based on its ability to correctly recover the received signal and may use this error rate as the received signal metric. Then, the receiver communicates a power control signal back to the transmitter that is based in part on the received signal metric. For example, when the received $E_b/N_t$ is high or the demodulated signal error rate is low, the receiver communicates power control information to the transmitter that allows the transmitter to decrease the transmitted power to the particular receiver. Conversely, when the received $E_b/N_t$ is low, or the recovered signal error rate is high, the receiver communicates a power control signal back to the transmitter requesting an increase in the transmitted power to the particular receiver.

The use of DTX compounds the problem of non-ideal signal recovery. In addition to the problem of not being able to correctly demodulate transmitted data, the receiver must also determine whether or not data was actually transmitted. The receiver uses a DTX detection algorithm to determine whether or not data was transmitted.

Errors in the DTX detection algorithm of a single receiver potentially affect the entire communication link. The DTX detection algorithm of a particular receiver may inaccurately determine that DTX occurred when in reality the received signal was too degraded to allow accurate recovery. In this instance, the receiver does not communicate a request to the transmitter to increase the transmit power because the receiver has determined that it accurately decoded a DTX occurrence. The performance of the particular receiver then is degraded over optimal since a request to increase the transmit power should have been sent. The converse situation has greater adverse effects on the communication link. In this situation, the DTX detection algorithm of a particular receiver determines that it was unable to recover the transmitted signal when, in reality, the transmitter did not transmit a signal and the receiver should have indicated DTX. In this situation, the receiver communicates a request to the transmitter to increase the transmit power level to the particular receiver. This results in a transmit power level that is higher than the receiver requires to achieve a given received signal quality. The excess power increases the interference level seen by all other users and thus decreases the capacity that the communication link is able to carry.

Thus, it can be seen that there is a need for accurate DTX detection in receivers that operate in DTX capable channels. The DTX detection components need to be physically small enough to fit into portable devices, such as mobile telephones, and should consume minimal resources within the receiver.

SUMMARY

Novel techniques are disclosed for detecting discontinuous transmission (DTX) over a communication channel. A received data frame is characterized as one of a Good frame, Erasure, or DTX. If a Good frame is not initially detected, a multi-dimensional quality metric is used to characterize the received frame as either an Erasure or DTX. A two dimensional quality metric may be generated using energy per bit to noise power ratio as a first dimension and re-encoded symbol error count as a second dimension. Alternatively, normalized re-encoded symbol energy may be used as the second dimension of the quality metric. The multi-dimensional quality metric may be generated using a polynomial having a number of variables equal to the number of dimensions. More than one multi-dimensional quality metric may be used to correspond to more than one processing mode in a receiver. The value of the multi-dimensional quality metric is computed based on the values of each dimension. The computed value is compared against a predetermined threshold and the frame is characterized based on the results of the comparison. The communication channel may be a CDMA wireless communication channel capable of DTX and the device may be a base station, base station controller, or mobile station.

BRIEF DESCRIPTION OF THE DRAWINGS

The features, objects, and advantages of the invention will become more apparent from the detailed description set forth below when taken in conjunction with the drawings in which like reference characters identify correspondingly throughout and wherein.

DETAILED DESCRIPTION OF EMBODIMENTS

Figure 1:
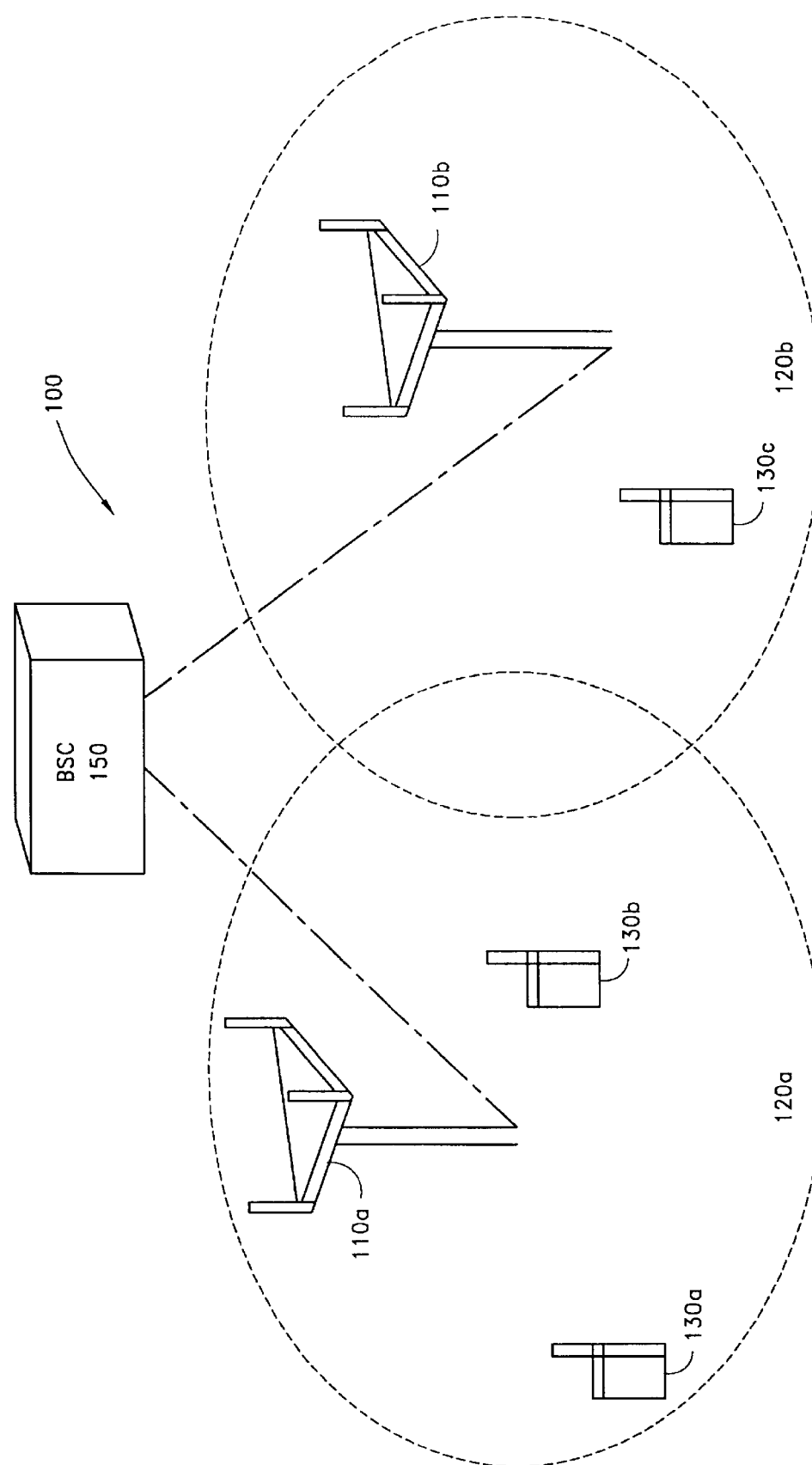
FIG. 1 is a diagram illustrating a wireless communication system implementing DTX detection.

The CDMA 2000 standard provides nine radio configurations for the Forward Traffic Channel. The signals that may be transmitted on the Forward Traffic Channel are defined to include a Forward Dedicated Control Channel (F-DCCH), a Forward Fundamental Channel (F-FCH), a Forward Power Control Subchannel, Forward Supplemental Code Channels (F-SCCH), and Forward Supplemental Channels (F-SCH). Any one of the nine defined radio configurations may have all or a subset of all of the defined channels within the Forward Traffic Channel. The F-DCCH and F-SCH may be capable of discontinuous transmission. In the case of the F-DCCH, the decision to enable or disable transmission is made on a frame by frame basis.

The CDMA 2000 standard also provides for six different radio configurations for the Reverse Traffic Channel. The signals that may be transmitted on the Reverse Traffic Channel are defined to include a Reverse Dedicated Control Channel, a Reverse Fundamental Channel, a Reverse Supplemental Channel, and a Reverse Supplemental Code Channel. Only some of the channels will be present in any particular radio configuration. The CDMA 2000 standard allows an operating mode (referred to as P2 mode) in which the Reverse Dedicated Control Channel (R-DCCH) is used together with the Reverse Supplemental Channel (R-SCH) without the transmission of a Reverse Fundamental Channel (R-FCH).

Furthermore, the CDMA 2000 standard allows both R-DCCH and R-SCH to support DTX. Both channels independently have the possibility of a DTX occurrence due to a frame not having been transmitted by a Mobile Station (MS). This occurs when the MS has no data to be transmitted or, in case of the R-SCH, when the MS does not have enough available power to transmit the R-SCH.

In both the forward link and reverse link channels capable of DTX, the decision to transmit or not transmit a frame is determined at the transmitter. The receiver has no prior knowledge of when DTX will occur. Because of the receiver's lack of knowledge as to the transmitter's decision to transmit DTX, some type of DTX detection occurs at the receiver to determine the presence of DTX. DTX detection may be implemented directly in the MS when the DTX transmission occurs on the forward link. Alternatively, DTX detection may occur in a signal processing stage coupled to an output of the MS, and in general may be implemented in any signal processing stage following the MS radio frequency (RF) receiver. Conversely, DTX detection may be implemented in the Base Station, Base Station Controller, or in any signal processing stage following receipt of the reverse link transmission when the DTX signals occur on the reverse link.

The DTX detection algorithm may provide one of the following possible outcomes for every received frame:

Good frame—the algorithm indicates a frame was transmitted and the successfully decoded frame does not contain bit errors.

Erasure—the algorithm indicates a frame was transmitted but the decoded frame contains bit errors.

DTX—the algorithm indicates no frame was transmitted.

Operation of DTX detection, as outlined in more detail below, may be implemented on both the forward and reverse links of a communication system. A communication system 100 is shown as a wireless communication system, such as a CDMA wireless phone system. The communication system 100 has one or more base stations, 110a and 110b, here shown as antenna systems typical of a wireless phone system. Although only two base stations 110a, 110b are shown, it is understood that the communication system 100 may support any number of base stations. Each base station 110a, 110b provides coverage for a corresponding cell 120a, 120b. The coverage areas or cells 120a, 120b supported by the two base stations 110a, 110b are shown to be overlapping. However, it is understood that where more than one base station is supported in the communication system 100, the cells supported by each base station may or may not overlap. Additionally, the cells of any three or more base stations may have some common coverage areas or may be mutually exclusive.

Since the operation of the communication system 100 within each cell is substantially identical, the discussion will focus on the operation within a single cell. A base station 110a supports coverage over a corresponding cell 120a. There may be one or more Mobile Stations (MS) 130a, 130b, within the cell 120a simultaneously communicating with the base station 110a. The MS 130a, 130b are shown as portable phones but it is understood that the MS 130a, 130b may be portable phones, mobile phones operating within vehicles, fixed position phones, wireless local loop phones, or any other type of communication device. The base station 110a communicates to each MS 130a, 130b, over a forward link channel and each MS 130a, 130b communicates to the base station 110a over a reverse link channel. The communication links may be over a continuously active channel or may allow for DTX. The base station 110a also communicates with a Base Station Controller (BSC) 150 that provides the communication link to a Public Switched Telephone Network (PSTN) not shown.

A BS 110a may communicate to a MS 130a using discontinuous transmission on the F-SCH. Additionally, Forward Error Correction (FEC) applied to the data on the F-SCH may be either convolutionally encoding or turbo encoding depending on the chosen radio configuration. A receiver in the MS 130a receives, demodulates, and decodes the signal in order to recover the data. The MS 130a incorporates DTX detection in order to accurately determine when the BS 110a is transmitting data and when the BS 110a is not transmitting data to it over F-SCH. The DTX detection algorithm uses multiple variables generated from the received signal in order to generate a multi-dimensional signal metric. The multi-dimensional signal metric is used to characterize the received data frame.

Figure 2:
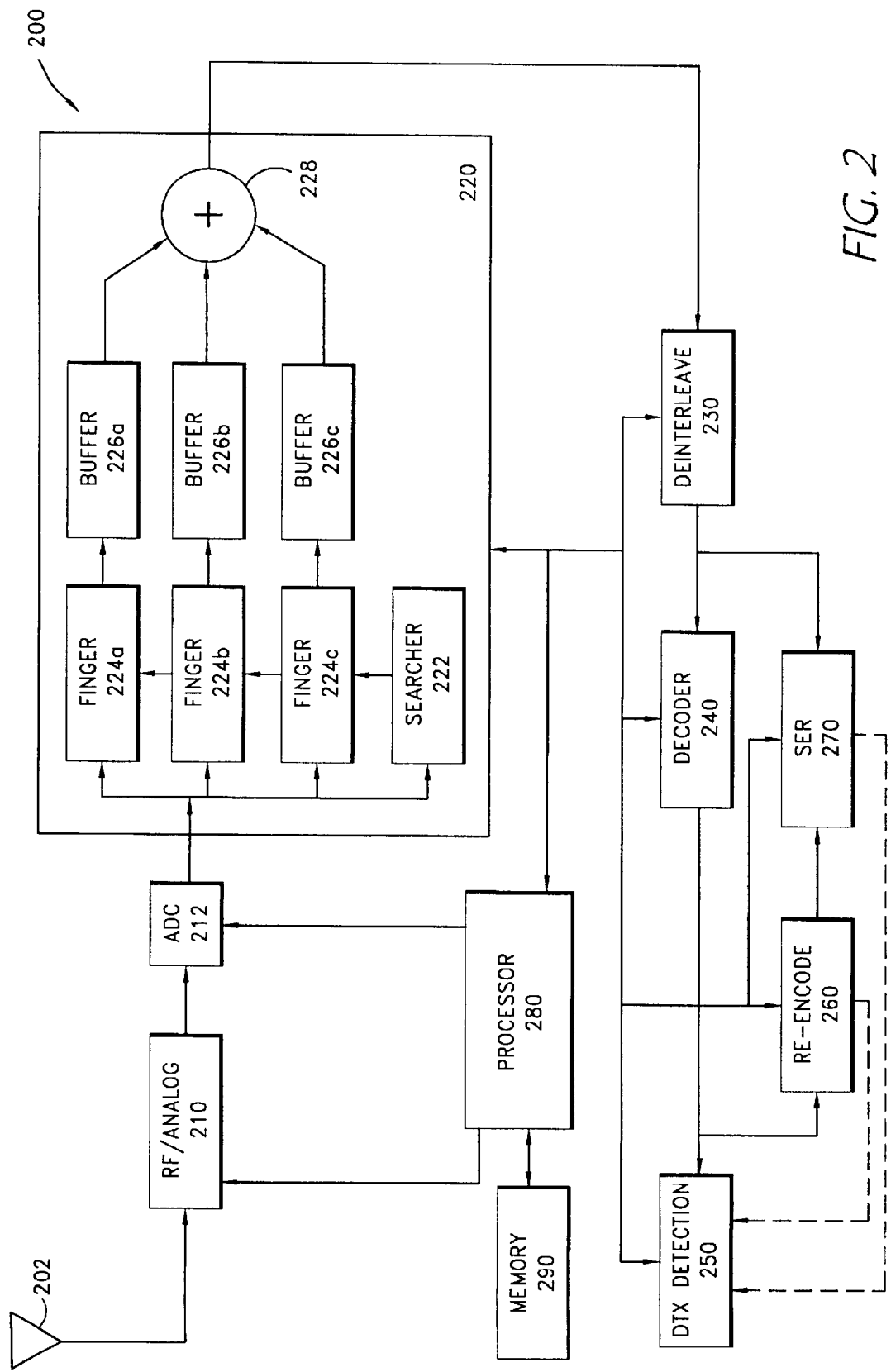
FIG. 2 is a block diagram of a receiver implementing DTX detection.

FIG. 2 shows a functional block diagram of a receiver 200. The receiver 200 may represent one half of a transceiver such as may be used in a wireless phone operating in a system that is compliant with the CDMA 2000 standard. A data signal is modulated at a BS in accordance with the forward link signal standards and is then transmitted to the receiver 200. An antenna 202 at the front end of the receiver 200 interfaces the receiver 200 to the free space wireless communication link. The received signal at the output of the antenna 202 is coupled to a Radio Frequency (RF)/analog section 210. The RF/analog section 210 is used to tune the receiver 200 to a specific assigned frequency band, down-convert the received signal to a lower frequency signal, filter the signal, and amplify the signal. The output of the RF/analog section 210 is an analog signal that is at a low Intermediate Frequency (IF) or at baseband. The processed analog signal is then coupled to an Analog to Digital Converter (ADC) 212 where the signal is sampled and converted to a digital representation. The digitized output of the ADC 212 is coupled to a rake receiver 220.

The rake receiver 220 gets its name from its internal structure. Within the rake receiver 220 there are multiple fingers 224a–224c that track different copies of the desired signal. The different path lengths used by the signal when it traverses from the BS to the receiver 200 produce multiple copies of the desired signal. The differing multipaths produce replicas of the desired signal that are offset slightly in time from one another. The rake receiver 220 capitalizes on the ability of a CDMA system to differentiate between small time differences of received signals by assigning each finger 224a–224c of the rake receiver 220 to a different time delayed copy of the desired signal. A searcher 222 is used to constantly search the digitized signal for strong signal paths. The searcher 222 may assign a signal from a particular signal path to a particular finger 224a–224c depending on the signal strength from that particular signal path. The path assignments are continually updated as the received signal changes. Thus, each finger 224a–224c is assigned a time offset copy of the same signal that is assigned to the other fingers. Although only three fingers 224a–224c are shown in the rake receiver 220, the actual number of fingers may vary according to the desires and design constraints of the receiver designer.

Ideally, each finger 224a–224c is assigned to a multipath signal that is not correlated to any other multipath signal assigned to any other finger 224a–224c. However, there are conditions where the multipath signals assigned to separate fingers 224a–224c will be correlated. One condition where multipath signals assigned to two different fingers 224a–224b may correlate is where the multipath signals merge due to changes in the multipaths. A first finger 224a may be assigned to a first multipath signal that corresponds to a first path length from a transmitter to the receiver 200. A second finger 224b may be assigned to a second initially uncorrelated multipath signal that corresponds to a second path length from the transmitter to the receiver 200. Each of the fingers 224a–224b continues to track the respective multipath signals until the searcher 222 changes the finger assignment. However, as the receiver 200 moves its location or antenna 202 orientation, the multiple path lengths change along with the corresponding multipath signals. It is conceivable that the path length, and thus multipath signal, tracked by the first finger 224a may at some point merge with the path length and corresponding multipath signal tracked by the second finger 224b. The fingers 224a–224b are no longer uncorrelated when the first and second path lengths produce a signal time offset that is smaller than a minimum discernable time offset.

Each finger 224a–224c determines the time offset between its assigned signal and a time reference. The finger 224a–224c makes the time alignment determination by correlating its assigned multipath signal to a time reference signal. The correlation also is used to despread the signal assigned to the finger 224a–224c. After making the time alignment determination, the finger 224a–224c writes the despread signal values to a corresponding buffer 226a–226c. The despread signals values written into the corresponding buffers 226a–226c represent time aligned versions of the same desired signal. Thus, the time aligned contents of the buffers 226a–226c may be coherently combined in a summer 228. Because noise is generally not correlated over the various time alignments assigned to the fingers 224a–224c, the noise does not coherently combine in the summer 228. Thus, the rake receiver 220 increases the desired signal to noise ratio by time aligning and coherently summing the time offset versions of the desired signals that are produced by multipath. The output of the rake receiver thus represents an aligned signal.

The coherently combined output from the rake receiver 220, representing the aligned signal, is coupled to a deinterleaver 230. The forward link signal is interleaved at the BS in order to lessen the effects of a burst of errors that may be caused, for example, by a fast signal fade due to destructively combining multipaths at the receiver front end. Interleaving the symbols before transmission and deinterleaving after reception causes bursts of errors to be spread out in time and to appear to the decoder as if they were random errors. The deinterleaver 230 performs block deinterleaving on the received symbols to rearrange the symbols to the order they were in prior to interleaving at the BS. The deinterleaved symbols are then coupled to the input of a decoder 240.

The symbols are decoded in a manner consistent with the encoding process used in the BS. As noted earlier, the different channels on the forward link may use different types of Forward Error Correction (FEC). Some channels, like the F-SCH, may use different types of FEC depending on the particular radio configuration. Symbols on F-SCH may be convolutionally encoded or turbo encoded depending on the supported radio configuration.

The receiver 200 implements a convolutional decoder, such as a Viterbi decoder, as the decoder 240 when the symbols are convolutionally encoded and the receiver 200 implements a turbo decoder as the decoder 240 when the symbols are turbo encoded. The decoded bits that are outputted from the decoder 240 may also include other signal quality indicators such as parity bits or Cyclic Redundancy Check (CRC) bits.

The decoded bits are coupled to a DTX detector 250 that may make a DTX determination on a frame by frame basis because that may be the same rate that the DTX decision is made at the BS. The DTX detector 250 accumulates the bits defining a single frame in order to make the frame determination. The DTX detector 250 uses signal characteristics of the received signal to help make the DTX determination. As described in more detail below, the DTX detector 250 calculates a multi-dimensional quality metric and uses the metric in the DTX determination. The DTX detector 250 may use signals from the Re-encoder 260 as well as the Symbol Error Rate (SER) block 270 as dimensions in the calculation of the quality metric.

A single dimension quality metric, such as one based on $E_b/N_t$, may be used in the DTX determination. However, such a single dimension quality metric may not perform as well as a multi-dimension quality metric. A single dimension quality metric based on $E_b/N_t$ provides good DTX detection performance when fingers in the rake receiver are not correlated, but provides diminished DTX detection performance when there are correlated fingers in the rake receiver. It is possible to define a DTX detection algorithm using both single dimension quality metrics and multi-dimension quality metrics where the single dimension quality metric is weighted more heavily when there are no correlated fingers and where the multi-dimension quality metric is weighted more heavily when there are correlated fingers.

The output of the decoder 240 is also coupled to a Re-encoder 260. The decoding process may be much more computationally intensive than the encoding process. This is because the decoder makes decisions as to the probability of each bit while the encoder entails a fairly straightforward computation. Therefore, the process of re-encoding the decoded bits and comparing the re-encoded symbols to the received symbols may be used to generate an error metric. The decoded bits that are output from the decoder 240 are re-encoded using the same FEC algorithm used in the BS. Thus, the Re-encoder 260 performs convolutional encoding if the decoder 240 performed Viterbi decoding and the Re-encoder 260 performs turbo encoding if the decoder 240 performed turbo decoding. The Re-encoder 260 also generates a re-encoded symbol energy. The re-encoded symbol energy may be calculated by taking each re-encoded symbol and multiplying by a corresponding soft decision value derived in the decoder 240 as part of the decoding process. Thus, the re-encoded symbol energy varies as a function of the quality of the input signal. As explained below in relation to FIG. 3, this is a value that may be provided to the DTX detector 250 as one dimension of the DTX quality metric.

The Re-encoder 260 provides the re-encoded data to a Symbol Error Rate (SER) check detector 270. The SER detector 270 receives the re-encoded symbols from the re-encoder 260 and an estimate of the received symbol data at the input to the decoder 240. The SER detector 270 compares the re-encoded symbols to the estimate of the received symbol data and counts the number of discrepancies between the re-encoded symbol data and the received symbol data. In addition to any CRC bits, the SER values help provide a determination of whether the frame has errors. The SER detector 270 may provide the SER count value to the DTX detector 250 as a dimension of the DTX quality metric.

Actual hardware implementations may limit the ability to use SER count as a dimension in the signal quality metric. Particular hardware implementations may saturate the SER count to a number of bits in order to limit the resources used to support the SER count. The trade off made in saturating a value to a limited number of bits is in the dynamic range that the count may represent. As an example, saturating the SER count to eight bits limits the dynamic range that may be represented by the count. Thus, depending on the dynamic range required for DTX detection, eight bits may not provide enough dynamic range for a usable signal quality metric dimension.

Returning to the block diagram, the output of the decoder 240 may also be provided to a user interface (not shown), another signal processing stage (not shown), or to another functional block within the receiver 200 or a transceiver (not shown) for which the receiver 200 is a part. The additional decoder 240 output routing possibilities are not shown for purposes of clarity.

A processor 280 coupled to memory 290 may be used to provide processing power or control for various blocks within the receiver 200. The processor 280 may control the analog gain of various amplifier stages in the RF/analog stage 210 as part of an Automatic Gain Control (AGC) loop. The processor 280 may generate Walsh codes or timing references used in the rake receiver 220 or may be used to provide the coherent summing function 228. The interconnections of the processor 280 to the various stages and the corresponding functions of the interconnections are provided only as examples and are not intended to be an exhaustive list of the interconnections or functions of the processor 280.

Figure 3:
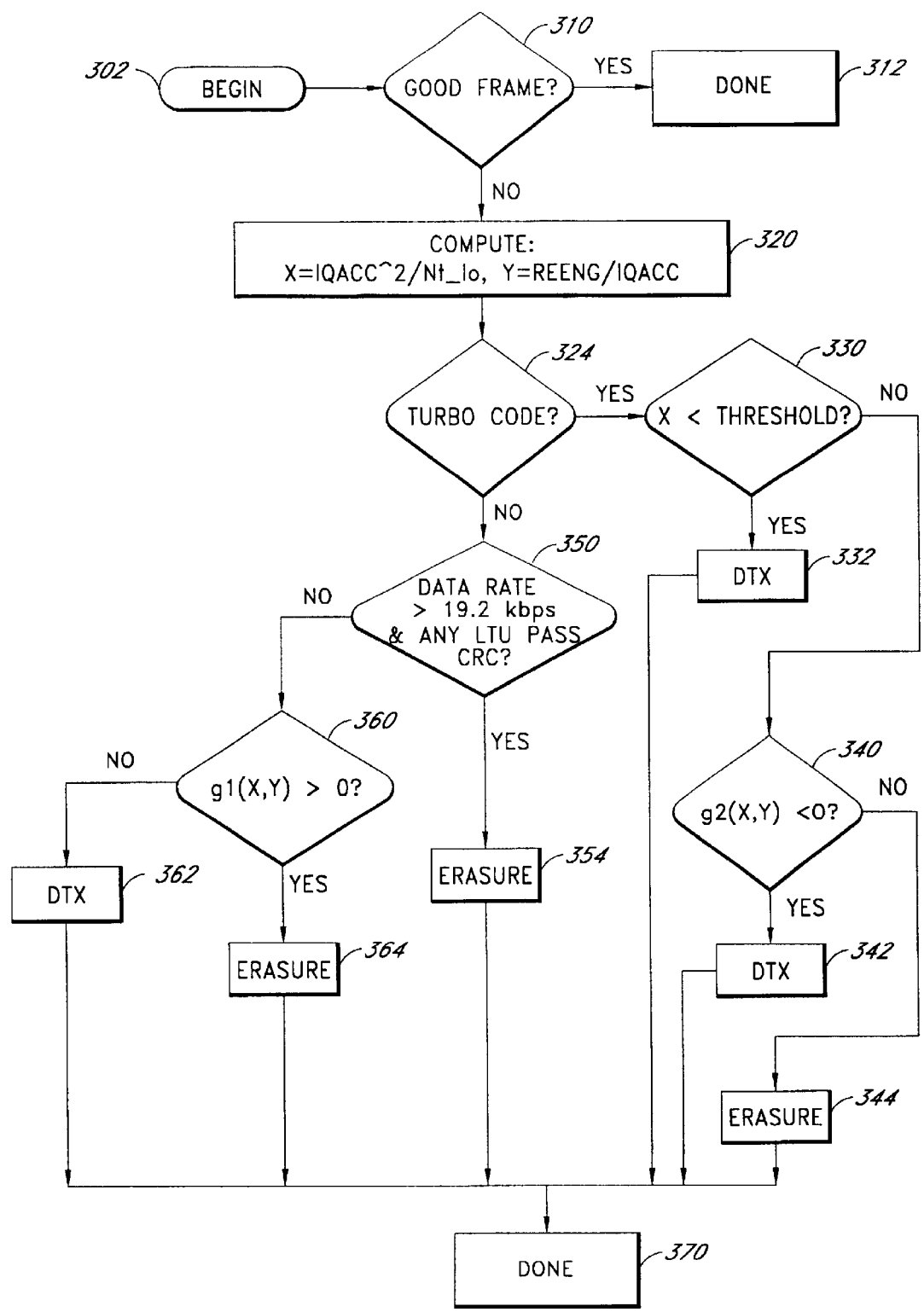
FIG. 3 is a flow chart of a DTX detection algorithm.

FIG. 3 provides a flow chart of the DTX detection algorithm 300 that may be implemented in functional block 250 of the CDMA receiver 200 shown in FIG. 2. The DTX detection algorithm 300 begins at block 302 when the algorithm is first called. The algorithm initially proceeds to decision block 310 where it tests to see if a Good frame was received. A Good frame may be verified by examining any signal quality indicators such as parity bits or Cyclic Redundancy Check (CRC) bits included in the decoded frame. The signal link may be of sufficient quality that there are no bit errors, or the number of bit errors may have been small enough to be corrected during decoding using FEC. The use of FEC and signal quality indicators, such as CRC bits, make an inaccurate Good frame determination a very low probability. Thus, the DTX detection algorithm 300 proceeds to block 312 and is done if the algorithm determines a Good frame was received.

Returning to block 310, if it is determined that a Good frame was not received, the algorithm proceeds to block 320. In block 320 the algorithm prepares the variables that represent the dimensions in the multi-dimensional signal quality metric. In block 320, the algorithm implements a two-dimensional signal quality metric where a first dimension, X, is an energy per bit to noise power ratio and a second dimension, Y, is a normalized re-encoded symbol energy. As discussed earlier, an SER count may be implemented as an alternative second dimension. The two dimensions are used as variables in a generator polynomial having a general form:

$$g(X, Y) = g0 + g1*X + g2*Y$$

The values g0, g1, and g2 represent predetermined constants. The DTX detection algorithm 300 may use more than one generator polynomial to generate more than one signal quality metric. The DTX detection algorithm 300 shown in FIG. 3 uses two generator polynomials having the form:

$$g1(X, Y) = g10 + g11*X + g12*Y$$

$$g2(X, Y) = g20 + g21*X + g22*Y$$

The constants, g10 through g22, may be the same or may be different, although at least one constant in the first generator polynomial should differ from a corresponding constant in the second generator polynomial such that the two generator polynomials are not identical. The use of a particular generator polynomial to generate a signal quality metric may depend on the configuration of the receiver, as explained in further detail below. The values for the constants, g0, g1, and g2, in each of the generator polynomials may be determined empirically using training algorithms that converge to a value based on an iterative process. The polynomial approximation may use the methods of least squares, divided differences, Lagrange interpolation, or some other polynomial approximation technique to determine the polynomial constants. Each polynomial is optimized for the particular choices of dimension. In the embodiment detailed in the flow chart of FIG. 3 where the first dimension is energy per bit to noise power ratio and the second dimension is normalized re-encoded symbol energy, the constants for a first generator polynomial are g10=−290, g11=0.014, and g12=53. The constants for a second generator polynomial for the same embodiment are g20=−181, g21=0.021, and g22=24.

Returning to block 320, the algorithm may receive variables from the functional blocks in the receiver where they are generated. Alternatively, the algorithm may receive components of the variables from the functional blocks and calculate the actual variable values. In block 320, the algorithm receives the components bit power, noise power, and re-encoded symbol energy and calculates the energy per bit to noise power ratio value ($E_b/N_t$) and the normalized re-encoded symbol energy value. The algorithm may compute the signal quality metrics in block 320 or may delay the polynomial computation until the block that actually requires the signal quality metric value. Delaying the polynomial calculations may save some processing power if the conditions for preferring one polynomial over another make use of one signal quality metric mutually exclusive of all other signal quality metrics. In the DTX detection algorithm 300 shown in FIG. 3, use of the signal quality metric generated using the first polynomial, g1(X, Y), is mutually exclusive of use of the signal quality metric generated using the second polynomial, g2(X, Y). Thus, it may be preferable to delay the calculations of g1(X, Y) and g2(X, Y) until the metrics are actually desired in a block.

The algorithm proceeds from block 320 to decision block 324 where the algorithm checks to see if the receiver is operating in a radio configuration that uses convolutional coding or turbo coding. The decoders for the two coding types operate in a different manner and thus a different signal quality metric may be used for each coding type. Using a signal quality metric that is dedicated to the particular coding type allows the algorithm to optimize the generator polynomial for the characteristics of the particular decoder implementation.

If the frame is turbo encoded, the algorithm proceeds to decision block 330 where the value of the X variable is checked against a predetermined threshold. Here, the variable X corresponds to a calculated $E_b/N_t$ and the predetermined threshold may correspond to a level of $E_b/N_t$ for which the probability of a frame being transmitted is low. Thus, the corresponding probability that a DTX frame occurred is likely high. The algorithm proceeds to block 332 if decision block 330 determines that the variable X is less than the predetermined threshold.

In block 332 the algorithm characterizes the frame as a DTX occurrence based on the determination that $E_b/N_t$, was less than the predetermined threshold. Once the frame is characterized in block 332, the algorithm proceeds to block 370 where it is done.

Returning to decision block 330, if the value of $E_b/N_t$ is not less than the predetermined threshold, the algorithm makes a closer examination of the received frame before characterizing it as an Erasure or DTX occurrence. The algorithm proceeds to decision block 340 where the value of the second signal quality metric is examined.

In the DTX detection algorithm 300, the second signal quality metric is optimized for turbo codes. Block 340 calculates the value of the second signal quality metric based on the second generator polynomial, if a prior block has not already calculated the value. The second quality metric is compared against a corresponding predetermined second metric threshold. The predetermined second metric threshold may be set to any desired constant by manipulating the value of the g20 constant. However, the predetermined second metric threshold may conveniently be set to zero by manipulating the value of the constant g20 in the second generator polynomial. If the value of the second signal quality metric is not less than zero, i.e. it is greater than or equal to zero, the algorithm proceeds from decision block 340 to block 344 where the frame is characterized as an Erasure. The algorithm then proceeds to block 370 where it is done once the frame is characterized.

Returning to block 340, if the decision block determines that the second signal quality metric is less than zero, the algorithm proceeds to block 342 and characterizes the frame as a DTX occurrence. The algorithm proceeds to block 370 where it is done once the frame is characterized.

Returning to decision block 324, the algorithm is optimized to use a different signal quality metric if the frame is convolutionally encoded. If decision block 324 determines that the frame was not turbo coded then the frame was convolutionally encoded. The algorithm then proceeds to decision block 350.

Decision block 350 checks to see if the data rate is above 19.2 kbps and if any Logic Transport Unit (LTU) passed CRC. The CDMA 2000 standard provides for a division of a frame into smaller LTU's when the data rate is 19.2 kbps or higher. Each of the LTU's includes CRC quality indicator bits as part of the LTU. The CRC bits in each LTU are separate and distinct from the frame quality indicator CRC bits that are part of the Forward Supplemental Channel frame structure. Decision block 350 initially checks to see if the data rate is higher than 19.2 kbps. If so, the frame is structured as multiple LTU's with each LTU having frame quality indicator CRC bits. Decision block 350 examines each LTU to see if any individual LTU within the frame passes CRC. If an LTU passes CRC the algorithm proceeds to block 354 where the frame is characterized as an Erasure. The algorithm proceeds from block 354 to block 370 where it is done.

Alternatively, when processing power or DTX detection speed is at a premium, block 350 may be omitted and the algorithm may proceed from decision block 324 directly to decision block 360 if convolutional coding is used on the frame. The cost of eliminating decision block 350 may be a higher rate of detection errors where Erasure frames are mis-characterized as DTX frames. The slight increase in false DTX detections, when the frame should have been characterized as an Erasure but was characterized as DTX, may be acceptable depending on the level of the increase and the corresponding improvement in DTX detection where previously the algorithm may have returned a false Erasure indication. Recall that false DTX indications potentially decrease the signal quality at the receiver while false Erasure indications potentially decrease overall link capacity and performance for all other receivers operating within the same coverage area. Thus, a trade off analysis would need to be performed in order to determine whether it is more beneficial to include or exclude decision block 350.

Returning to decision block 350, if the data rate is less than 19.2 kbps or if none of the LTU's pass CRC, the algorithm proceeds to block 360 to examine the first signal quality metric. Block 360 computes the first signal quality metric if a previous block has not already computed the value. The quality metric is then compared against a predetermined first metric threshold. As was the case for the second metric threshold, the predetermined first metric threshold may be set to any constant value because of the structure of the first generator polynomial. It may be convenient to define the constants in the first generator polynomial such that the predetermined first metric threshold may be set to zero.

With the first metric threshold set to be zero, the algorithm, in decision block 360, checks to see if the first signal quality metric is greater than zero. If so, the algorithm proceeds to block 364 and characterizes the frame as an Erasure. The algorithm then proceeds to block 370 where it is done.

Returning to decision block 360, if the first signal quality metric is not greater than zero, i.e. the quality metric is less than or equal to zero, the algorithm is routed to block 362 where the frame is characterized as a DTX occurrence. From block 362 the algorithm proceeds to block 370 where it is done.

Thus, it can be seen that a multi-dimensional signal quality metric may be used to provide accurate DTX detection. While the discussion above concentrated on a receiver operating in a MS on the F-SCH signal, it may be seen that the general concepts of a multi-dimensional signal quality metric for use in a DTX detection algorithm are equally applicable to implementation at a base station or base station controller for DTX detection of reverse link signals. Additionally, the MS may incorporate the same concepts in DTX detection on any forward link channel capable of DTX.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a mobile station, base station, or base station controller. In the alternative, the processor and the storage medium may reside as discrete components in a mobile station, base station, or base station controller.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. In a communication device, a method of detecting discontinuous transmission (DTX) comprising:
   generating a multi-dimensional quality metric; and
   characterizing a received frame based in part on the multi-dimensional quality metric, wherein generating the multi-dimensional quality metric comprises
   generating a first quality metric based on a first polynomial; and
   generating a second quality metric based on a second polynomial.

2. The method of claim 1, wherein both the first and second polynomials are of the form $g0+g1*X+g2*Y$, where $g0$, $g1$, and $g2$ represent polynomial constants and X and Y represent two dimensions of the multi-dimensional quality metric.

3. The method of claim 2, wherein the polynomial constants for the first quality metric are different from the polynomial constants for the second quality metric.

4. The method of claim 2, wherein:
   the first polynomial is $-290+0.014X+53Y$; and
   the second polynomial is $-181+0.021X+24Y$.

5. The method of claim 1, wherein the received frame is characterized using the first quality metric when the received frame is a convolutionally encoded frame.

6. The method of claim 5, wherein the received frame is characterized as a DTX if the first quality metric is less than or equal to a predetermined threshold.

7. The method of claim 5, wherein the received frame is characterized as an Erasure if the first quality metric is greater than a predetermined threshold.

8. The method of claim 1, wherein the received frame is characterized using the second quality metric when the received frame is a turbo encoded frame.

9. The method of claim 8, wherein the received frame is characterized as a DTX if the second quality metric is less than a predetermined threshold.

10. The method of claim 8, wherein the received frame is characterized as an Erasure if the second quality metric is greater than or equal to a predetermined threshold.

11. The method of claim 1, wherein the communication device is one of a CDMA base station, CDMA base station controller, or CDMA mobile station.

12. In a communication device, a discontinuous transmission (DTX) detector comprising:
   means for generating a multi-dimensional quality metric; and
   means for characterizing a received frame based on the multi-dimensional quality metric, wherein the means for generating the multi-dimensional quality metric comprises
   means for generating a first quality metric based on a first polynomial; and
   means for generating a second quality metric based on a second polynomial.

13. The device of claim 12 wherein both the first and second polynomials are of the form $g0+g1*X+g2*Y$, where $g0$, $g1$, and $g2$ represent polynomial constants and X and Y represent two dimensions of the multi-dimensional quality metric.

14. The device of claim 13, wherein the polynomial constants for the first quality metric are different from the polynomial constants for the second quality metric.

15. The device of claim 13, wherein:
   the first polynomial is $-290+0.014X+53Y$; and
   the second polynomial is $-181+0.021X+24Y$.

16. The device of claim 12, wherein the received frame is characterized using the first quality metric when the received frame is a convolutionally encoded frame.

17. The device of claim 16, wherein the received frame is characterized as a DTX if the first quality metric is less than or equal to a predetermined threshold.

18. The device of claim 16, wherein the received frame is characterized as an Erasure if the first quality metric is greater than a predetermined threshold.

19. The device of claim 12, wherein the received frame is characterized using the second quality metric when the received frame is a turbo encoded frame.

20. The device of claim 19, wherein the received frame is characterized as a DTX if the second quality metric is less than a predetermined threshold.

21. The device of claim 19, wherein the received frame is characterized as an Erasure if the second quality metric is greater than or equal to a predetermined threshold.

22. The device of claim 12, wherein the communication device is one of a CDMA base station, CDMA base station controller, or CDMA mobile station.

23. An article of manufacture comprising:
   a computer usable medium having computer readable program code means embodied therein for detecting discontinuous transmission (DTX), the computer readable program code means in said article of manufacture comprising:
   computer readable program code means for generating a multi-dimensional quality metric; and
   computer readable program code means for characterizing a received frame based in part on the multi-dimensional quality metric, wherein generating the multi-dimensional quality metric comprises
   generating a first quality metric based on a first polynomial; and
   generating a second quality metric based on a second polynomial.

24. A program storage device readable by a machine, tangibly embodying a program of instructions executable by the machine to perform method steps for detecting discontinuous transmission (DTX), said method steps comprising:
   generating a multi-dimensional quality metric; and
   characterizing a received frame based in part on the multi-dimensional quality metric, wherein generating the multi-dimensional quality metric comprises
   generating a first quality metric based on a first polynomial; and
   generating a second quality metric based on a second polynomial.

* * * * *